United States Patent [19]

Wallach et al.

[11] 4,409,655
[45] Oct. 11, 1983

[54] HIERARCHIAL MEMORY RING PROTECTION SYSTEM USING COMPARISONS OF REQUESTED AND PREVIOUSLY ACCESSED ADDRESSES

[75] Inventors: Steven Wallach, Framingham; Kenneth D. Holberger, North Grafton; David L. Keating, Natick; Steven M. Staudaher, Northboro, all of Mass.

[73] Assignee: Data General Corporation, Westboro, Mass.

[21] Appl. No.: 143,981

[22] Filed: Apr. 25, 1980

[51] Int. Cl.³ .................... G06F 9/00; G06F 9/32; G06F 9/34
[52] U.S. Cl. .................................................. 364/200
[58] Field of Search ... 364/200 MS File, 900 MS File

[56] References Cited

U.S. PATENT DOCUMENTS

| 3,264,615 | 8/1966 | Case et al. | 364/200 |
|---|---|---|---|
| 3,562,717 | 2/1971 | Harmon et al. | 364/200 |
| 3,573,855 | 4/1971 | Cragon et al. | 364/200 |
| 3,742,458 | 6/1973 | Inoue et al. | 364/200 |
| 3,803,559 | 4/1974 | Bandoo et al. | 364/200 |
| 3,815,101 | 6/1974 | Boss et al. | 364/200 |
| 3,893,084 | 7/1975 | Kotok et al. | 364/200 |
| 4,084,225 | 4/1978 | Anderson et al. | 364/200 |
| 4,087,856 | 5/1978 | Attanasio et al. | 364/200 |
| 4,177,510 | 12/1979 | Appell et al. | 364/200 |
| 4,184,201 | 1/1980 | Melberg et al. | 364/200 |
| 4,241,401 | 12/1980 | De ward et al. | 364/200 |

Primary Examiner—James D. Thomas
Assistant Examiner—Archie E. Williams
Attorney, Agent, or Firm—Robert F. O'Connell

[57] ABSTRACT

A data processing system handles thirty-two bit logical addresses which can be derived from either sixteen bit logical addresses or thirty-two bit logical addresses. The system uses hierarchical memory storage using in a particular embodiment eight storage segments (rings), access to the rings being controlled in a privileged manner according to different levels of privilege. The segment locations are designated by successive segment numbers having a descending order of protection with reference to data accesses thereto. A current address for data access includes a segment identification and a comparison is made with the segment identification of a preceding address to determine whether access can be made by the current address.

9 Claims, 1 Drawing Figure

HIERARCHIAL MEMORY RING PROTECTION SYSTEM USING COMPARISONS OF REQUESTED AND PREVIOUSLY ACCESSED ADDRESSES

INTRODUCTION

This invention relates generally to data processing systems and, more particularly, to such systems which can handle 32 bit logical addresses at a size and cost which is not significantly greater than that of systems which presently handle only 16 bit logical addresses.

RELATED APPLICATIONS

This application is one of the following groups of applications, all of which include the same text and drawings which describe an overall data processing system and each of which includes claims directed to a selected aspect of the overall data processing system, as indicated generally by the titles thereof as set forth below. All of such applications are being filed concurrently and, hence, all will have the same filing date of Apr. 25, 1980.

(1) Data Processing System, Ser. No. 143,561 filed by E. Rasala, S. Wallach, C. Alsing, K. Holberger, C. Holland, T. West, J. Guyer, R. Coyle, M. Ziegler and M. Druke;

(2) Data Processing System Having A Unique Address Translation Unit, Ser. No. 143,681 filed by S. Wallach, K. Holberger, S. Staudener and C. Henry;

(3) Data Processing System Utilizing A Hierarchical Memory Storage System, Ser. No. 143,981 filed by S. Wallach, K. Holberger, D. Keating and S. Staudener;

(4) Data Processing System Having A Unique Memory System, Ser. No. 143,974 filed by M. Ziegler and M. Druke;

(5) Data Processing System Having A Unique Instruction Processor System, Ser. No. 143,651 filed by K. Holberger, J. Veres, M. Ziegler and C. Henry;

(6) Data Processing System Having A Unique Microsequencing System, Ser. No. 143,710 filed by C. Holland, K. Holberger, D. Epstein, P. Reilly and J. Rosen;

(7) Data Processing System Having Unique Instruction Responsive Means, Ser. No. 143,982 filed by C. Holland, S. Wallach and C. Alsing.

BACKGROUND OF THE INVENTION

Presently available data processing systems which are often referred to as belonging to the "mini-computer" class normally handle logical addresses and data words which are 16 bits in length. As used herein, the term "logical" address, sometimes referred to by those in the art as a "virtual" address, is used to denote an address that is programmer visible, an address which the programmer can maipulate. In contrast, a "physical" address is the address of a datum location in the main memory of a data processing system. Operating data processing systems utilize appropriate translation tables for converting logical addresses to physical addresses.

Such mini-computers have been successfully used in many applications and provide a high degree of data processing capability at reasonable cost. Examples of such systems which have found favor in the market-place are those known as the "Nova" and the "Eclipse" systems designed and developed by Data General Corporation of Westboro, Mass. The Nova and Eclipse family of mini-computers are described in the publications available from Data General Corporation which are listed in Appendix A incorporated as part of this specification.

The Nova system provides a logical address space of 64 kilobytes (the prefix "kilo" more accurately represents 1024, or $2^{10}$) and the Eclipse system also provides a logical address space of 64 kilobytes, both being proven systems for handling many applications at reasonable cost. It is desirable in the development of improved systems to provide for an orderly growth to an even larger logical address space than presently available in Nova and Eclipse systems. Such an extended logical address base permits a larger set of instructions to be utilized by the system, the enlarged instruction set being capable of including substantially all of the basic instructions now presently available in the prior Nova and Eclipse systems as well as a large number of additional, or extended, instructions which take advantage of the increased or expanded logical address space.

Accordingly, such an improved system should be designed to be responsive to software which has been previously designed for use in Nova and Eclipse systems so that those presently having a library of Nova and Eclipse software, representing a substantial investment, can still use such software in the improved, expanded address system. The improving system also would provide for a greater flexibility in performance at a reasonable cost so as to permit more on-line users at a larger number of on-line terminals to utilize the system. The expanded address space would further permit the system to support more extensive and sophisticated programs devised specifically thereafter, as well as to support all of the previous programs supported by the unextended Nova or Eclipse systems.

Moreover, with particular reference to the invention disclosed herein, such system should be designed so that access to different memory locations can be hierarchically arranged, i.e., access to certain memory locations may be permissible to the current user of the system while access to certain other memory locations may be prohibited to the current user of the system to whom such access has not been allocated. Suitable techniques must be devised for controlling such access decisions and for providing appropriate memory location protection checks in order to do so.

BRIEF SUMMARY OF THE INVENTION

The system of the invention utilizes a unique combination of central processor and memory units, the processor comprising an address translation unit, an instruction processor unit, an arithmetic logic unit and a microsequencing unit, while the memory unit includes a system cache unit, a main memory unit and a bank controller unit for controlling data transfers therebetween. The system handles thirty-two bit logical addresses which can be derived from either sixteen bit or thirty-two bit addresses. Unique means are provided for translating the thirty-two bit logical addresses. In the particular invention claimed herein, the system uses hierarchical memory storage, wherein information is stored in different segment storage regions (rings), access to the rings being controlled in a privileged manner so that access to different rings are governed by different levels of privilege.

Thus, as set forth herein the memory system is arranged to store different groups of data at different memory locations, designated as specific segment (or ring) locations which have, in accordance with the invention, a descending order of protection with respect to data accesses by a current user of the overall system. Accordingly, when a data reference has been permitted to a memory address in a particular current segment location, the user is prohibited from making a subsequent data reference to an address in a segment location which has a lower order of protection than the current segment location. Further, the protection technique is also arranged to control a subroutine "call" (e.g. a request for access to a subroutine in a segment which is different from the current segment in which the main routine is located) as well as a return from a subroutine "call".

The memory system uses a main memory comprising a plurality of memory modules each having a plurality of memory planes. The main memory normally interfaces with the remainder of the system via a dual port system cache memory unit, block data transfers between the main memory and the system cache are controlled by a bank controller unit.

Macro-instructions are decoded using a unique programmable read-only-memory means which is capable of decoding instructions of two types, i.e., instructions from a first basic instruction set or instructions from a second extended instruction set, the instruction which is being decoded containing in itself selected bit patterns which uniquely identify which type of instruction is to be decoded.

The decoded instructions provide the starting address of one or more incroinstructions, which starting address is supplied to a unique microinstruction sequencing unit which appropriately decodes a selected field of each microinstruction for determining the address of the next successive microinstruction, such address being suitably selected from a plurality of microaddress sources.

The overall system includes means responding to certain macro-instructions which perform unique operations indigenous to the overall system.

BRIEF DESCRIPTION OF THE DRAWINGS

The invention can be described in more detail with the help of the drawings wherein.

Figure 1:
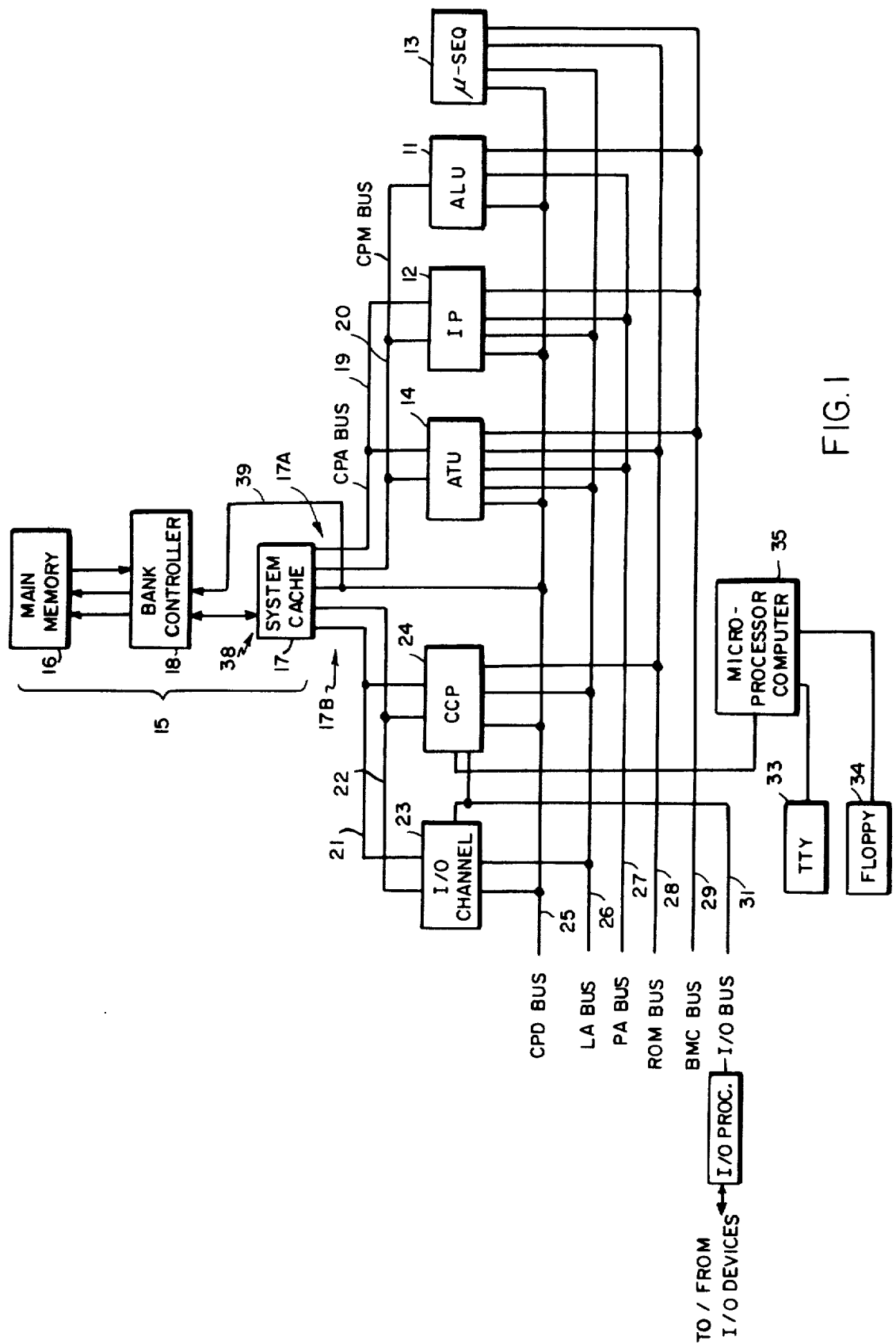
FIG. 1 shows a block diagram of the overall data processing system of the invention as described therein.

This application incorporates by reference the entire application, Ser. No. 143,651, filed on Apr. 25, 1980, of Kenneth Holberger et al.

More particularly, attention is directed to FIGS. 79-100 of the drawings, in application Ser. No. 143,651 and to that part of the descriptive portion of the specification in the section designated "Address Translation Unit", which relates to element No. 14 ("ATU") on FIG. 1 herein.

What is claimed is:

1. In a data processing system which utilizes memory storage means for storing a plurality of different groups of data, said memory storage means being capable of storing said different groups of data at different designated locations thereof, said designated locations being identifiable as storage segment locations, said locations being designated by successive segment nembers and having a descending order of protection with respect to data reference accesses by an operator such that the degree of protection of a segment location becomes successively higher as the segment number thereof becomes successively lower, the addresses of data in each group thereof being accompanied by a plurality of selected bits which identify the storage segment location in which said data is stored, said system comprising comparing means for responding to said selected bits which accompany an address and which identify the storage segment location at which a data reference access is being requested to compare said selected bits with a plurality of selected bits which accompany a current address and which identify the storage segment location at which currently requested data reference access has already been provided with respect to said current address; and means responsive to said comparing means for prohibiting a data reference access to an address at a storage segment location which the selected bits of the address at which said data reference is being requested identify as a segment location having a higher segment number than the segment number of the selected bits of said current address.

2. A system in accordance with claim 1 wherein said comparing means includes means for providing a plurality of selected bit which correspond to the selected bits of an already accessed address which identify the storage segment in which the data reference corresponding to said already accessed address is stored;

means responsive to the selected bits of said already accessed address and to the selected bits of the next successive address to be accessed in order to determine the order of protection of the storage segment in which said next address is stored relative to the order of protection of said already accessed address to provide a segment control signal when said next successive address corresponds to a data reference stored in a storage segment location having a lower order of protection than the storage segment location of a data reference of the already accessed address.

3. A system in accordance with claim 2 wherein said data reference access prohibiting means includes means responsive to said segment control signal for producing a coded error protection signal which indicates that the data reference at said next successive address is in a storage segment location which is prohibited from access; and means responsive to said coded error signal for producing a coded fault signal identifying that a specified fault has occurred due to the presence of said coded error protection signal.

4. A system in accordance with claim 1 and further including means for providing access to data references in a current storage segment;

means for providing program control instructions which call for access to subroutines stored in a storage segment location different from the storage location currently being used for data references;

means responsive to said program control instructions for determining whether a specified called storage segment in which a subroutine is located has a higher order of protection than said current storage segment; and means further responsive to said program control instructions when said called storage segment has said higher order of protection for providing entry into said called storage segment and access to a subroutine therein.

5. A system in accordance with claim 4 and further including means for indicating a subroutine call fault condition when said called storage segment has a lower order of protection than said current storage segment.

6. A system in accordance with claim 4 and further including
   means for providing a program control instruction which requires a return from operation with respect to a called storage segment to operation with respect to said current storage segment;
   means for determining whether said current storage segment has a lower order of protection than said called storage segment; and
   means responsive to a return address in said current storage segment for providing access to said return address when said current storage segment has said lower order of protection.

7. A system in accordance with claim 6 and further including means for indicating a return fault condition when said current storage segment has a higher order of protection than said called storage segment.

8. A system in accordance with claim 4 wherein said entry providing means includes
   means responsive to said program control instruction to provide a branch address including a first field identifying the called storage segment and a second field specifying a coded number representing a specified location in said called storage segment;
   said called storage segment having a storage location which identifies an array of successive coded numbers representing successive locations resident in said called storage segment;
   means for comparing the coded numbers of said branch address with the maximum coded number representing the maximum location resident in said called storage segment;
   means for permitting said entry into said called storage segment and access to the subroutine therein when the coded number of said branch address is determined to be less than said maximum coded number.

9. A system in accordance with claim 8 and further including means for indicating a cell fault condition when the coded number of said branch address is determined to be equal to or greater than said maximum coded number.

* * * * *